United States Patent [19]

Link et al.

[11] 4,092,916
[45] June 6, 1978

[54] CONTROLLED-DEFLECTION ROLL

[75] Inventors: Christoph Link; Wolf-Gunter Stotz, both of Ravensburg, Germany

[73] Assignee: Escher Wyss Limited, Zürich, Switzerland

[21] Appl. No.: 826,159

[22] Filed: Aug. 19, 1977

[30] Foreign Application Priority Data

Sep. 22, 1976 Switzerland ............. 11989/76

[51] Int. Cl.$^2$ .............................. B30B 3/04
[52] U.S. Cl. .................. 100/174; 100/162 B; 15/256.51; 29/116 AD; 162/281
[58] Field of Search ........... 100/174, 155, 162, 162 B; 15/256.5, 256.51, 256.53; 101/425; 162/281; 118/119, 122, 126; 29/113 AD, 116 R, 116 AD

[56] References Cited

U.S. PATENT DOCUMENTS

| 1,476,894 | 12/1923 | Judd | 100/174 X |
| 2,767,529 | 10/1956 | Scott | 100/174 X |
| 3,097,390 | 7/1963 | Thaler et al. | 15/256.51 |
| 3,802,044 | 4/1974 | Spillmann et al. | 29/113 |
| 3,885,283 | 5/1975 | Biondetti | 29/116 |

Primary Examiner—Peter Feldman
Attorney, Agent, or Firm—Werner W. Kleeman

[57] ABSTRACT

A controlled-deflection roll having a stationary roll support or carrier and a tubular roll shell rotatable about the stationary roll support. The tubular roll shell bears upon the roll support or carrier through the intermediary of at least one bearing or support element. The roll shell is provided at its ends with guide members which are rotatably mounted in the roll shell and which are guided on the roll support in the direction of the pressing or contact movement or the disengaging or lift-off movement of the roll shell. The controlled-deflection roll is provided with a scraper device equipped with a scraper blade which, during operation, is in contact with the surface of the roll shell, and the scraper device is secured to the guide members.

5 Claims, 3 Drawing Figures

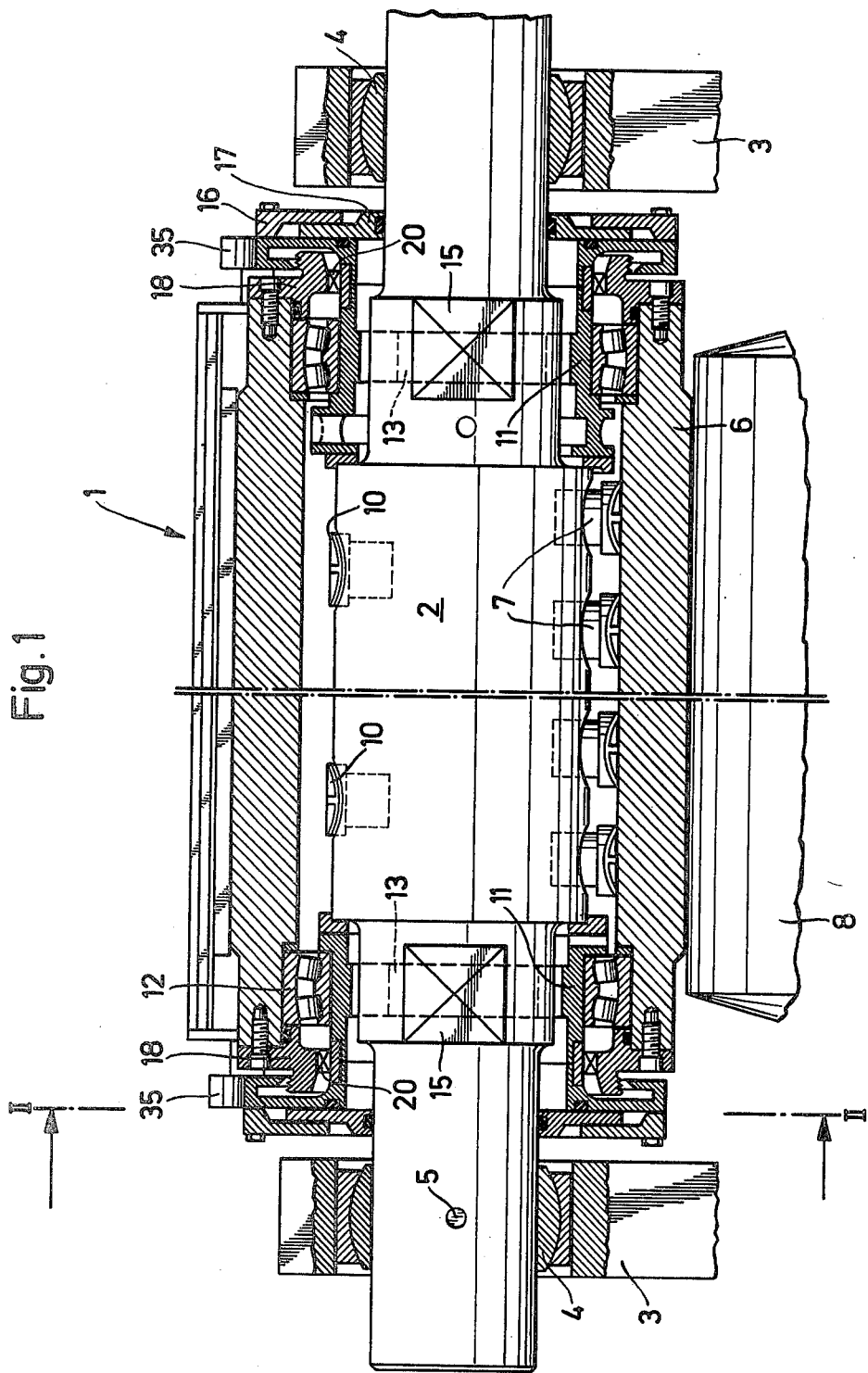

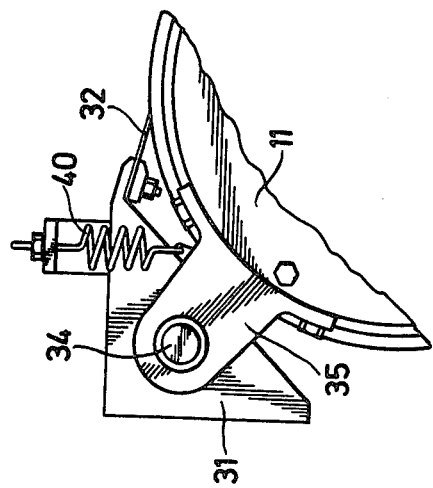
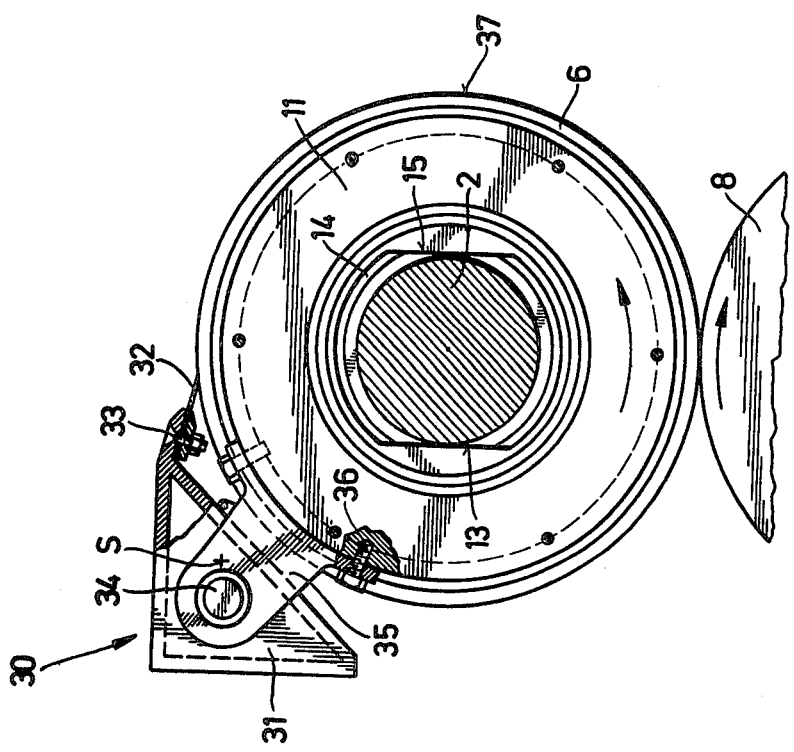

4,092,916

CONTROLLED-DEFLECTION ROLL

BACKGROUND OF THE INVENTION

The present invention relates to a new and improved construction of a controlled-deflection roll having a stationary roll support or carrier and a tubular roll shell which is rotatable about such stationary roll support, the tubular roll shell bearing on the roll support by means of at least one bearing or support element. Further, the roll shell is provided at its ends with guide members which are rotatably mounted in the roll shell and which are guided on the roll support in the direction of the pressing or disengaging movement of the roll shell.

Controlled-deflection rolls of this type — sometimes referred to in the art as rolls with bending compensation — are known, for instance from U.S. Pat. Nos. 3,802,044 and 3,885,283, corresponding to Swiss Pat. Nos. 556,946 and 571,904 respectively. With rolls of this type, it is possible to compensate for deflection in rolling mills where the rolls cooperate with a backing roll or counter-roll, and it is even possible to carry out a desired adjustment of the course of the roll deflection i.e. the pressing or contact force. Controlled-deflection rolls are therefore increasingly used for instance in papermaking machines and in textile processing.

In certain fields of application, for instance in papermaking machines, the controlled-deflection roll has to be fitted with a scraper device having a scraper blade which scrapes clean the surface of the roll shell. This operation assists, for instance, a rolled web from being disengaged from the roll shell or to clean the surface thereof. The scraper blade is accurately adapted to the surface of the roll shell, and the roll surface must possess a very high quality, whether it be formed of metal or for instance rubber.

Oftentimes it is also required that the pressing or contact roll, in other words, whichever roll of the pair applies the pressing or contact force, be disengageable from the backing roll so that the rolling mill can be opened. In the case of the heretofore known solid rolls having an external contact or pressing mechanism, it is usual practice to secure the scraper device to the roll levers and to move such together with the roll.

However, when there is employed as the pressing or contact roll a controlled-deflection roll of the type referred to, then the positioning of the scraper device leads to difficulties, since it cannot be mounted in the manner possible on solid rolls and the roll support does not move together with the roll shell.

SUMMARY OF THE INVENTION

Hence, with the foregoing in mind it is a primary object of the present invention to provide an improved construction of a controlled-deflection roll equipped with a scraper device which is not associated with the aforementioned drawbacks and limitations of the prior art constructions.

Another and more specific object of the present invention aims at the provision of a new and improved construction of a controlled-deflection roll of the aforementioned type, wherein the above-indicated problem can be solved with simple means, and wherein without the need to resort to the use of complicated devices there can be accomplished a movement of the scraper device together with the roll shell.

Now in order to implement these and still further objects of the invention which will become more readily apparent as the description proceeds, the controlled-deflection roll of the present development is manifested by the features that such roll is equipped with a scraper device having a scraper blade which, during operation, contacts the surface of the roll shell, and the scraper device is attached to the guide members.

Due to the arrangement of the scraper device according to the invention there is ensured that the scraper device will move automatically during each movement of the roll shell relative to the roll support or carrier and therefore relative to the backing roll or counter-roll. By virtue of these features there is attained the noteworthy advantage that the scraper blade does not disengage from the surface of the roll shell during such movements and therefore permanently remains in its position on the roll shell where it is adapted or accommodated to the surface thereof. No special devices or controls are needed for disengaging the scraper.

The guide members preferably have retaining or holder members to which there can be secured a blade carrier or support of the scraper device, this blade carrier extending axially of the roll shell from one end thereof to the other. In this manner there is realized a very simple embodiment of a roll.

In this case, the blade carrier can be rotatably mounted on the retaining or holder members. As a result, it is possible to adjust the force with which the scraper blade presses against the surface of the roll shell. The axis of the rotatable mounting and the center of gravity of the blade carrier together with the scraper blade can be chosen such that the blade is pressed against the surface of the roll shell by the action of gravity. Consequently, once the scraper has been appropriately positioned, it is possible to produce a pressing or contact force of a required magnitude without the use of additional pressing or contact means. However, there can also be provided resilient means, such as springs for the purpose of producing or determining the contact or pressing force of the scraper blade.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is an axial sectional view through a controlled-deflection roll constructed according to the teachings of the present invention;

FIG. 2 is a sectional view taken along the line II—II of FIG. 1; and

FIG. 3 is a view of part of the arrangement of FIG. 2 showing another embodiment of the scraper device.

DETAILED DESCRIPTION OF THE PREFERRED EMBODIMENTS

Describing now the drawings, it is to be understood that only enough of the structure of the controlled-deflection roll 1, shown by way of example in FIG. 1, will be illustrated and described to enable those skilled in the art to readily understand the underlying concepts of the present invention. This controlled-deflection roll 1 will be seen to comprise a stationary roll support or carrier 2 mounted in the frame means or supports 3. Located within the frame means or supports 3 are substantially spherical bearing shells 4 which enable the ends of the roll support or carrier 2 to pivot in the supports 3 as a result of deflection or sag of the roll support or carrier 2. Means, such as a pin 5 or equivalent structure, can be provided to prevent the roll support or carrier 2 from rotating in the frame means or supports 3.

Continuing, it will be seen that a roll shell 6 is mounted to be rotatable about the roll support or carrier 2. During operation, the roll shell 6 is supported by means of hydrostatic pressure or pressing element 7 supplied with a hydraulic pressure medium through piping (not shown). A controlled-deflection roll of this type is known to the art from U.S. Pat. No. 3,802,044, to which reference may be readily had and the disclosure of which is incorporated herein by reference. Lifting elements 10 of identical construction to the pressure elements 7 are provided for the purpose of lifting-off or disengaging the roll shell 6 from a backing roll or counter-roll 8.

As will also be seen by referring to FIG. 1, guide members 11 are arranged at the ends of the roll shell 6 and are mounted therein by means of the roller bearings 12. As illustrated in FIG. 2, the guide members 11 are provided with parallel guide surfaces 13 formed in an opening or aperture 14 which extends around the roll support or carrier 2. This roll support 2 is provided at the corresponding locations with parallel guide surfaces 15 which coact with the guide surfaces 13. Due to this construction, the guide members 11 are prevented from carrying out a rotation in relation to the roll support or carrier 2, and at the same time the guide members 11 are also guided on the roll support 2 in the pressing or contact direction and in the disengaging or lift-off direction, i.e., the force direction of the pressure elements 7 and the lift-off elements 10, and thus, guide the roll shell 6. This type of controlled-deflection roll is known to the art from U.S. Pat. No. 3,885,283, which corresponds to Swiss patent No. 556,946, to which reference may be readily had and the disclosure of which is incorporated herein by reference.

As can also be seen by referring to FIG. 1, there are operatively associated with each of the guide members 11 the closure or end members 16, 17 which serve to seal off from the outside the intermediate space between the related guide member 11 and the roll support or carrier 2. Additionally, there are provided the closure or end members 18 having the seals or gaskets 20 which seal the intermediate spaces or gaps between the guide members or elements 11 and the roll shell 6.

Also as will be recognized by referring to FIGS. 1 and 2, the controlled-deflection roll 1, constructed according to the teachings of the invention, is equipped with a scraper device 30 comprising a blade support or carrier 31 and a scraper blade 32. The scraper blade 32 or equivalent structure is exchangeably secured by screws 33 or other suitable fastening devices at the blade carrier or support 31.

This blade carrier or support 31 is equipped at its ends with the pins 34 which are rotatably mounted in the retaining or holder members 35 which are fixedly screwed to the outer peripherial surfaces of the guide members 11 by screws 36 or equivalent structure.

In order to produce a contact or pressing force, the axis of the rotatable mounting of the blade carrier 31 in the holder or retaining members 35, i.e., the axis of the pins 34 and the center of gravity S of the blade carrier 31 together with the scraper blade 32, can be selected such that the scraper blade 32 is pressed by the force of gravity against the surface 37 of the roll shell 6. It should be understood however, that for instance according to the modified showing of FIG. 3 there also can be employed springs 40, the ends of which are attached to the related holder or retaining member 35 and the blade support or carrier 31 and determine the contact or pressing force. As illustrated, these springs 40 can act in the direction of gravity, or also, they can act against the force of gravity, i.e., they can reduce the pressure exerted upon the scraper.

Although the controlled-deflection roll having hydrostatic pressure or bearing elements is of the type described and shown in U.S. Pat. No. 3,802,044, it is to be expressly understood that this description is not of course limited to this constructional embodiment and that the elements can be constructed in any random suitable configuration.

While there are shown and described present preferred embodiments of the invention, it is to be distinctly understood that the invention is not limited thereto, but may be otherwise variously embodied and practiced within the scope of the following claims. Accordingly,

What we claim is:

1. A controlled-deflection roll comprising:
   a stationary roll support;
   a substantially tubular roll shell having an outer surface;
   means mounting said tubular roll shell to be rotatable about said stationary roll support;
   at least one bearing element by means of which the tubular roll shell bears on the roll support;
   said roll shell having opposed ends;
   said mounting means including guide members rotatably mounted in the roll shell and guided upon the roll support in the direction of the pressing or disengaging movement of the roll shell;
   a scraper device having a scraper blade provided for the controlled-deflection roll;
   said scraper blade, during operation of the controlled-deflection roll, being in contact with the outer surface of said roll shell; and
   means for securing the scraper device to the guide members.

2. The controlled-deflection roll as defined in claim 1, wherein:
   said securing means comprises retaining members provided for the guide members;
   said scraper device including a blade carrier secured to said retaining members; and
   said blade carrier extending axially of the roll shell from one end thereof to the other.

3. The controlled-deflection roll as defined in claim 2, wherein:
   said blade carrier is rotatably mounted on said retaining members.

4. The controlled-deflection roll as defined in claim 3, wherein:
   said securing means comprises a rotatable mounting for the scraper device;
   said rotatable mounting having an axis wherein said axis and the center of gravity of the blade carrier together with the scraper blade are selected such that said scraper blade is pressed under the action of the force of gravity onto the outer surface of the roll shell.

5. The controlled-deflection roll as defined in claim 3, further including:
   resilient means for exerting a pressure by means of which the scraper blade bears against the outer surface of the roll shell.

* * * * *